May 22, 1923. Re. 15,613
J. H. WHEELOCK
SIGN FLASHER
Original Filed May 11, 1917
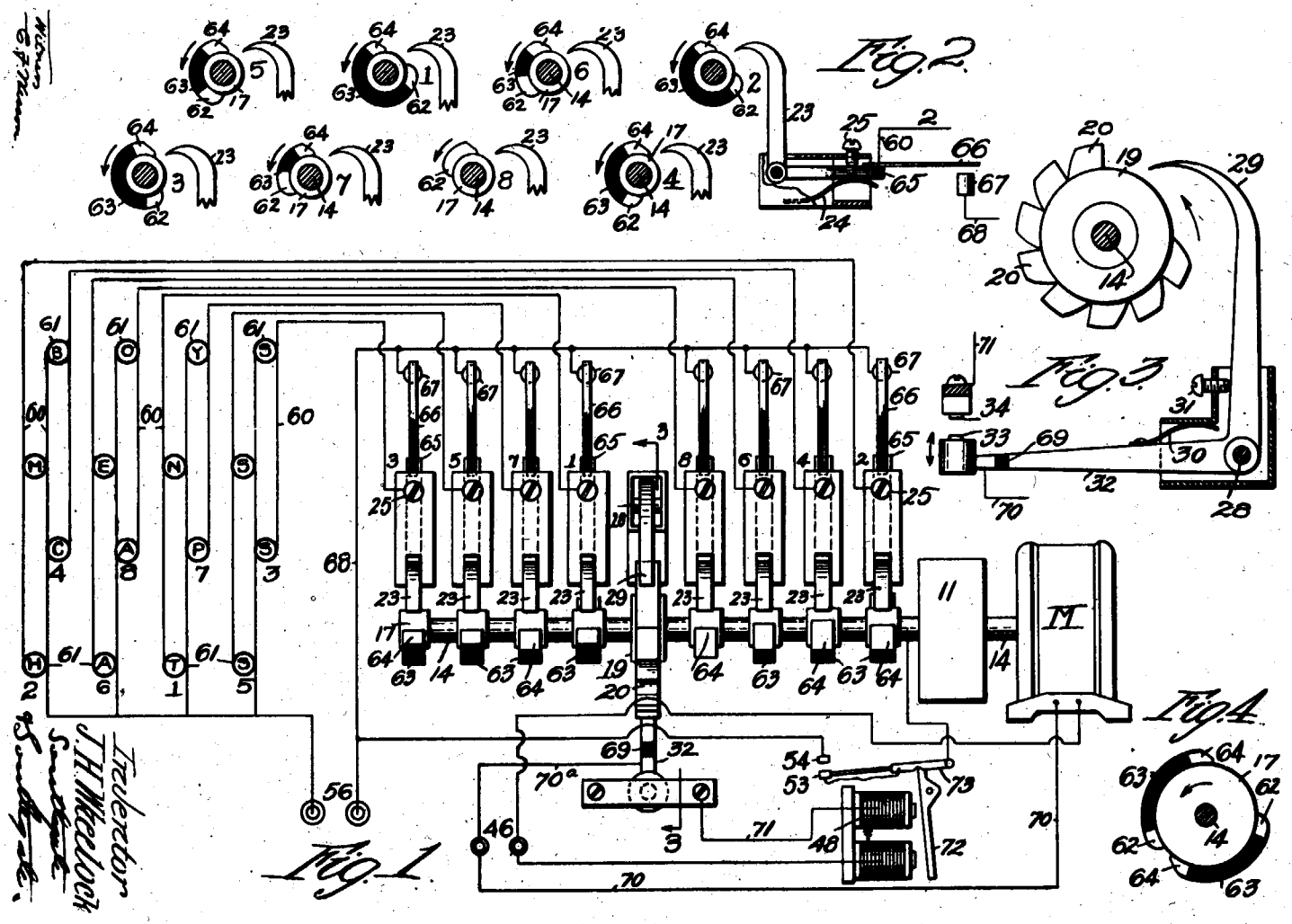

Reissued May 22, 1923. Re. 15,613

UNITED STATES PATENT OFFICE.

JOHN H. WHEELOCK, OF FITZWILLIAM, NEW HAMPSHIRE, ASSIGNOR TO SIGNAL ENGINEERING AND MANUFACTURING COMPANY, OF NEW YORK, N. Y., A CORPORATION OF MASSACHUSETTS.

SIGN FLASHER.

Original application filed May 11, 1917, Serial No. 168,018. Renewed February 6, 1922, Serial No. 534,589. Original No. 1,428,499, dated September 5, 1922. Application for reissue filed December 16, 1922. Serial No. 607,445.

*To all whom it may concern:*

Be it known that I, JOHN H. WHEELOCK, a citizen of the United States, residing at Fitzwilliam, county of Cheshire, State of New Hampshire, formerly of Worcester, Mass., have invented a new and useful Sign Flasher, of which the following is a specification.

This invention relates to a controlling system for a sign flasher or equivalent device.

The principal objects of the invention are to provide a simple construction for this purpose which will be capable of being modified in an extremely simple way to cause the different parts of the sign to flash on and off in any order that may be desired without materially enlarging or complicating the mechanism, and especially to provide a construction for this purpose which shall be of such a simple character that it can be contained within very small compass, and also to arrange the parts so that no sparking or arcing can be caused in the instrument itself, all the arcing being provided for between two terminals which can be located at any desired distance from the instrument.

Further objects and advantages of the invention will appear hereinafter.

Reference is to be had to the accompanying drawings in which—

Fig. 1 is a diagrammatic plan view of a system and mechanism constructed and arranged in accordance with this invention;

Fig. 2 is a composite figure containing end views of the several controlling cams showing them all in their relative positions on the shaft, which is shown in section, and one of them showing the contacting member and connected parts;

Fig. 3 is a sectional view on the line 3—3 of Fig. 1 showing the master wheel in elevation; and Fig. 4 is a view similar to one of the parts of Fig. 2 showing a modified form.

In carrying out the invention I have made use of mechanism such as shown in my patents granted on April 4, 1916, Nos. 1,178,431 and 1,178,432, and have illustrated the mechanism shown in the former of those patents herein, although the other one could be used in a similar manner. It is to be observed, however, that this mechanism is not connected up with any selector in this case, but is used for the purpose of controlling the order and duration of the energization of the sign circuits. Wherever I have illustrated an element which may conveniently be constructed and operated the same as in said Patent No. 1,178,431 I have given it the reference number used therein and reference may be had to that patent for further description of such elements.

In the arrangement shown herein a high tensioned circuit is made use of having terminals 56, one of which is connected directly to the sign which embodies a plurality of circuits or wires 60 arranged in multiple with lamps 61 arranged in any desired way. These lamps, of course, may be provided with letters figures, or any desired kind of signs or may be used merely to illuminate separate ones and in fact may be used in any way in which intermittently illuminated signs are now constructed.

For the purpose of explaining this invention the several wires 60 are also given numbers from 1 to 8 inclusive to correspond with certain parts of the apparatus as will appear. It is to be observed also that there are a pair of low tension terminals 46 which are shown as constantly connected with a motor M so that this motor will be constantly driven. It will be understood, of course, that any desired button or switch may be employed in the line for turning it off. This motor through gears, not shown, but located in a gear box 11, drives a shaft 14. On this shaft are located the several metallic discs 17, one corresponding with each of the numbers from 1 to 8 and so numbered in Figures 1 and 2. These discs are provided with controlling elements consisting of conducting sections 62 projecting from them and taking the place of the teeth 18 of the above mentioned patents but in this case each metallic section, except that of No. 8, is supplemented by an insulating section 63 and a second metallic section 64. The maximum radii of the sections 62, 63 and 64 not only on each disc, but on all of them, are equal, and the insulating sections 63 are arranged concentric with the adjacent ends of the contacting sections 62 and 64. Each contacting section 62 is provided with an inclined entrance surface for gradually raising the contact finger 23 and each metallic section 64 is provided with a slanting surface for gradually lowering it and then a sudden drop off at the end. Each of these fingers 23 is mounted to oscillate independently on a pin and is provided with a projecting arm 65 normally held up by a spring 24 against an adjusting screw 25. This arm 65 is provided with a spring-projection 66 and is connected in each case with one of the sign circuits 60. The one shown in full in Fig. 2 is connected with that one numbered 2 for example. Arranged in position to be engaged by each spring 66 when the corresponding finger 23 is forced out to its limiting position is a stationary contact 67, which are all connected directly through a line 68 with the other terminal of the line 56, thus shunting the circuits around the controlling element 62 on the shaft.

It is to be noted that when any one of the fingers 23 is in contact with its metallic section 62 the corresponding part of the sign, as for example, the circuit 2, is connected with the shaft 14 on which all the metallic contacting discs 17 are mounted. The circuit, however, is broken at the open contacts 53—54. For the purpose of completing this circuit the master contacting finger 29, which is operated by all the teeth 20 on the disc 19 also fixed on the shaft 14, is arranged to swing about the pin 28 in opposition to a spring 30 to raise its arm 32. This arm has upon it a contact 33 which is separated from the arm 32 by insulation 69, and it is adapted to engage a stationary contact 34. The contact 33 is connected by a wire 70[a] with one of the terminals 46 of the low tension circuit while the contact 34 is connected by wire 71 with an electro-magnet 48 which is adapted to draw to it an armature 72 and thus raise an arm 73 and close the contacts 53—54. This switch or relay is not claimed herein as it constitutes the subject matter of a companion application in the name of Emerling, Wheelock and Rohland, Serial No. 90,763, filed April 12, 1916, patented July 9, 1918, No. 1,271,873. It operates obviously to close these contacts and also operates to hold the armature 72 away from the core of the electro-magnet when the contacts are open as shown in the drawing. The inward swinging of the finger 29 caused by the spring 30 and the weight of the arm 32 and the parts mounted upon it is limited by the adjustable screw 31.

In the operation of the device the control disc No. 1 first closes a contact in the lighting circuit at that point by its projecting section 62 coming into contact with the contact finger 23, but no current will flow because this circuit from one terminal 56, through the selected sign circuit to the shaft 14 and back to the other terminal 56 is still open at the contacts 53—54. The operation of the master wheel 19 then closes its contact 33—34 of the low tension current energizing the electro-magnet 48 and thus closing the contacts 53—54. The high tension or lighting current then flows through one section of lights on the No. 1 circuit to that finger 23, the No. 1 contact section 62, shaft 14, arm 73, contacts 53—54, and back to the other terminal 56. It will be seen therefore that the arcing is confined to the contacts 53—54 which may be located at any desired place entirely away from the rest of the instrument if desired.

It will be understood that this operation takes place while the finger 23 is rising. As it rises to its limit the contact 66—67 is made but no spark is caused here because the current is already flowing through the parallel circuit just described. However, this permits the current to be shunted through the No. 1 lights on the sign and back to the line 68 without going around through the shaft, etc., and therefore if the contacts 53—54 separate, as they immediately do, the No. 1 lights of the sign will continue to burn without flicker or variation. The contact finger 29, immediately after the completion of the circuit for No. 1 lights, passes off the first tooth 20. Thereafter No. 2 circuit is completed and brought into operation in the same way, so after this is accomplished the two fingers 23 of the No. 1 and No. 2 circuits will keep those circuits used through the contacts 66—67 by the engagement of these fingers 23 with the insulated sections 63 on those discs. The rest of the circuits are then completed separately and in succession in the same way except that No. 8 mechanism contains no insulating disc. It is to be seen, therefore, that the No. 1 to No. 8 projecting sections 62 come in contact with their respective fingers 23 in each case before the master contactor 29 closes that circuit at 53—54. As shown in the drawings they remain in contact with the metal sections 62 for only one-eleventh of the circumference. The forward sides of the sections 62 are so shaped as to permit a not too abrupt swinging of the arms 23 and the closing of the circuit at the contacts 53—54 before the circuit is closed at the contacts 66—67. Immediately after the closing of the contacts 66—67 it is permissible for the arm to pass off the corresponding metal section 62 on to the insulated section 63. If no insulated section were employed, a portion of the lighting circuit would continue to flow from the arm to the shaft during the rotation of the latter, but the current might vary and the lights flicker due to slight irregularities between the relatively moving contacts. By closing the circuit at the contacts 66—67 and thereafter causing the arm 23 to pass on to an insulated section on the shaft, no current will flow through the arm and the main circuit will not pass through any pair of relatively moving contacts. These circuits are made one after the other and remain closed until after the cam No. 8 has operated, then in the form shown, all these fingers 23 leave their cams simultaneously or practically so just after the master contactor 29 drops off the last tooth 20 and breaks all the circuits at 53—54 and cuts off all current through the instrument except that to the motor which continues to operate. The arcing all takes place at 53—54.

In Fig. 4 I have shown a modification in which there are two sets of sections or controlling elements 62, 63 and 64 on the disc 17 so that the corresponding finger 23 will be lifted twice during one rotation and the sign circuit controlled by it in that case will be flashed on and off and then on and off again. This can be used whether all the others are arranged in the same way or not as desired, and obviously can be multiplied materially without greatly increasing the diameter of the discs and without enlarging the machine in any way except to increase this diameter. In this way great variation of the sign flashing can be secured with very small additions to the size of the machine and practically none to the cost and complication thereof, the wiring remaining the same.

It is thought that what has been said about Fig. 4 is sufficient to show how the device could be made to operate in various ways by using one or more sets of controlling elements 62, 63 and 64 as shown in that figure on each disc or on certain of the discs.

It is to be seen therefore that the instrument is exceedingly simple and compact and all the arcing can be made to take place at a distance from the main instrument where the electro-magnet 48 and connected parts are located; that on account of the insulating section 63 there is no possibiltiy of arcing at the ends of the fingers 23 as the arm 29 is connected and disconnected with the circuit, even in the case of accummulation of dust or the like on these surfaces; and that in order to greatly complicate the flashing of the sign no change has to be made in the circuits and no increase in the size of the instrument except in the diameter of the sections located on the discs 17, so that a wide range of usefulness is secured without material change in the instrument. Obviously the device can be arranged to control other things than visible signs as for example an audible one in the form of a music playing device.

Although I have illustrated and described only a single system of wiring and shown the invention as applied to the instrument shown in my Patent No. 1,178,431 I am aware of the fact that modifications can be made therein without departing from the scope of the invention as expressed in the claims. Therefore I do not wish to be limited to all the features shown, but what I do claim is:—

1. In a system of the class described, the combination of a plurality of circuits in multiple connected with a source of power, a plurality of controlling elements for said circuits, a shaft on which said elements are fixed, a master wheel on said shaft, means controlled by said master wheel for connecting said controlling elements with said source of power, means for connecting each controlling element with its circuit as said shaft rotates, and means for thereafter completing each circuit through a shunt around its corresponding controlling element.

2. In a system of the class described, the combination of a plurality of circuits in multiple connected with a source of power, a plurality of controlling elements, one for each of said circuits, a continuously rotating shaft on which said elements are fixed, a master wheel on said shaft, means controlled by said master wheel for connecting said shaft with said source of power, means for causing said controlling elements on the shaft to first connect its circuit with the shaft, means whereby the master wheel will then act to cause the shaft to be connected with said source of power, and means whereby thereafter the controlling elements on the shaft will cause their respective circuit connections to be connected directly with the source of power.

3. In a sign flasher system, the combination of a plurality of sign flasher circuits in multiple connected with one terminal of a source of power, a plurality of simultaneously rotatable controlling elements, one for each of said flasher circuits, a master wheel rotatable with them, means controlled by said master wheel for connecting all of said controlling elements with the other terminal of said source of power, means whereby as said elements rotate each of them will first be caused to be connected with its sign circuit and the master wheel will then act to cause them to be connected with said other terminal of the source of power, and means whereby thereafter the controlling elements will cause their respective sign connections to be connected directly with said other terminal of the source of power independently of said elements, said controlling elements being so set respectively as to cause the herein above specified series of actions to commence at different times with respect to the several circuits, and also being arranged so that the said connections will be broken for all of said sign circuits substantially simultaneously.

4. In a sign flasher system, the combination of a plurality of sign flasher circuits in multiple connected with one terminal of a source of power, a plurality of simultaneously rotatable controlling elements, one for each of said flasher circuits, a master wheel rotatable with them, a separate circuit having normally open means controlled by said master wheel for connecting all of said controlling elements with the other terminal of said source of power, means whereby as said elements rotate each of them will first be caused to be connected with its sign circuit, means whereby the master wheel will then act to cause them to be connected with said other terminal of the source of power, and means whereby thereafter the controlling elements will cause their respective sign connections to be connected directly with said other terminal of the source of power independently of said elements.

5. In a sign flasher system, the combination of a plurality of sign flasher circuits in multiple connected with a source of power, a plurality of controlling elements, one for each of said flasher circuits, a continuously rotating shaft on which said elements are fixed, a master wheel on said shaft, means controlled by said master wheel for connecting said shaft with said source of power, means whereby as said shaft rotates each of said controlling elements on the shaft will first be caused to connect its sign circuit with the shaft, means whereby the master wheel will then act to cause the shaft to be connected with said source of power, and means whereby thereafter the controlling elements on the shaft will cause their respective sign connections to also be connected directly with the source of power, said controlling elements being so set on the shaft as to cause the herein above specified series of actions to commence at different times with respect to the several controlling devices and their circuits, whereby the sign circuits will have their connections with the source of power completed one after the other, the master wheel being arranged to break its contact with said source of power before the direct sign circuits are broken.

6. In a sign flasher system, the combination of a plurality of sign flasher circuits in multiple connected with a source of power, a plurality of controlling elements, one for each of said flasher circuits, a continuously rotating shaft on which said elements are fixed, a master wheel on said shaft, means controlled by said master wheel for connecting said shaft with said source of power, means whereby as said shaft rotates each of said controlling elements on the shaft will first be caused to connect its sign circuit with the shaft, means whereby the master wheel will then act to cause the shaft to be connected with said source of power, certain of said controlling elements on the shaft comprising a metallic section shaped to control the above specified sequence of operations, and then an insulating section of the same radius and finally a metallic section of the same radius from which the circuit is broken.

7. In a sign flasher system, the combination of a plurality of sign flasher circuits in multiple connected with a source of power, a plurality of controlling elements, one for each of said flasher circuits, a separate circuit having normally open means for connecting all of said controlling elements with the other terminal of said source of power, means whereby each of said elements will first be caused to be connected with its sign circuit and will then be connected with said other terminal of the source of power, and means whereby the controlling elements will cause thereafter their respective sign connections to be connected directly with said other terminal of the source of power independently of said elements.

8. In a system of the class described, the combination of a source of power, a circuit connected to the terminals thereof, a shaft, a controlling element and a master wheel on said shaft, means for closing contacts in said circuit by said controlling element upon the rotation of said shaft, means for thereafter closing other contacts in said circuit to complete the latter upon a predetermined rotation of said master wheel and means for thereafter shunting the circuit around said controlling element and breaking connections at the latter.

9. A system of the class described, including a source of power, a circuit including two parallel branch portions, one of said branch portions having a pair of circuit closers arranged therein in series and the other of said branches having a single circuit closer, a rotatable shaft, a controlling element and a master wheel carried thereby, means for operating one of said first mentioned circuit closers upon a predetermined rotation of said controlling element, means controlled by said master wheel for thereafter operating the other of said first mentioned circuit closers to complete the circuit, and means operated by a further movement of said controlling element for closing of circuit in the second mentioned branch circuit, and permitting the breaking of the circuit in the first mentioned branch without arcing.

In testimony whereof I have hereunto affixed my signature.

JOHN H. WHEELOCK.